(12) United States Patent
Baratin et al.

(10) Patent No.: US 11,338,651 B2
(45) Date of Patent: May 24, 2022

(54) GUIDE FOR SLIDING GLAZING, IN PARTICULAR AUTOMOBILE

(71) Applicant: HUTCHINSON, Paris (FR)

(72) Inventors: Sylvain Baratin, Corquilleroy (FR); Eddy Skraburski, Montargis (FR)

(73) Assignee: HUTCHINSON, Paris (FR)

( * ) Notice: Subject to any disclaimer, the term of this patent is extended or adjusted under 35 U.S.C. 154(b) by 519 days.

(21) Appl. No.: 16/471,463

(22) PCT Filed: Dec. 19, 2017

(86) PCT No.: PCT/EP2017/083489
§ 371 (c)(1),
(2) Date: Jun. 19, 2019

(87) PCT Pub. No.: WO2018/114913
PCT Pub. Date: Jun. 28, 2018

(65) Prior Publication Data
US 2020/0215881 A1 Jul. 9, 2020

(30) Foreign Application Priority Data

Dec. 21, 2016 (FR) ...................................... 1662984

(51) Int. Cl.
*B60J 1/17* (2006.01)
*E05D 15/16* (2006.01)
(Continued)

(52) U.S. Cl.
CPC ............... *B60J 1/17* (2013.01); *B60J 5/0402* (2013.01); *E05D 15/165* (2013.01); *B60J 1/006* (2013.01); *E05Y 2900/55* (2013.01)

(58) Field of Classification Search
CPC .......... B60J 1/17; B60J 5/0402; E05D 15/165
(Continued)

(56) References Cited

U.S. PATENT DOCUMENTS 4,621,453 A * 11/1986 Watanabe ................ B60J 10/79
49/227
9,902,240 B2 * 2/2018 Kawabe ................ B60J 5/0402
(Continued)

FOREIGN PATENT DOCUMENTS

| EP | 0 083 696 A2 | 7/1983 |
| WO | 2014/191812 A1 | 12/2014 |

OTHER PUBLICATIONS

International Search Report dated Apr. 19, 2018, issued in corresponding International Application No. PCT/EP2017/083489, filed Dec. 19, 2017, 4 pages.

*Primary Examiner* — Jason S Morrow
(74) *Attorney, Agent, or Firm* — Christensen O'Connor Johnson Kindness PLLC

(57) ABSTRACT

The guide for sliding glazing intended to be added and fastened onto a glazing and to cooperate with a sliding joint. The guide comprising a body of elongated shape and a longitudinal base extending along the axis of elongation of the body. A first face of the guide applied and fastened onto a glazing surface and a second face opposite the first face, the second face cooperating by sliding with said joint. The longitudinal base including a thinned portion at at least one free longitudinal end. A thickness of the thinned portion, in a direction substantially perpendicular to said first face, decreasing at least in the longitudinal direction in such a way that said second face is flush with said glazing surface on said at least one free end.

21 Claims, 5 Drawing Sheets

(51) Int. Cl.
  *B60J 5/04*      (2006.01)
  *B60J 1/00*      (2006.01)
(58) Field of Classification Search
  USPC .......................................... 296/146.2, 146.3
  See application file for complete search history.

(56) References Cited

U.S. PATENT DOCUMENTS

| | | | |
|---|---|---|---|
| 10,427,511 B2* | 10/2019 | Blottiau | B60J 5/0402 |
| 10,442,281 B2* | 10/2019 | Krause | B60J 1/17 |
| 10,787,851 B2* | 9/2020 | Freymuth | B60J 1/17 |
| 11,059,360 B2* | 7/2021 | Guellec | B60J 1/10 |
| 2020/0130488 A1* | 4/2020 | Choi | B60J 1/17 |
| 2021/0347239 A1* | 11/2021 | Nolte | B60J 10/76 |

* cited by examiner

GUIDE FOR SLIDING GLAZING, IN PARTICULAR AUTOMOBILE

TECHNICAL FIELD

This invention relates in particular to a guide for sliding glazing, in particular automobile, as well as a sliding glazing equipped with such a guide.

STATE OF THE ART

In the automobile field, guiding a sliding glazing laterally flush with an outer surface of a vertical element of an edge of a door frame adjacent to the glazing, for aesthetic reasons, has already been proposed. This vertical element is generally an upright of the frame or a vertical external trim provided on this frame, such as a "B" pillar of the vehicle. The fact that the glazing is level with respect to this vertical element is referred to as "flush", as the outer face of the glazing is located substantially in the same lateral plane as that of this vertical element.

In what follows, the qualifiers "axially internal" and "axially external" shall usually be used to designate the position of a part laterally inwards and outwards of the motor vehicle, respectively, in reference to the axial direction Y, which is by definition perpendicular to the plane XZ defined by the longitudinal horizontal direction X and by the vertical direction Z of the vehicle (see FIG. 1 annexed to this description).

In a motor vehicle of this type, a door frame is equipped with a sliding joint 10 intended to receive the sliding glazing 12 (FIG. 1). This glazing 12 is equipped with at least one guide 14 added and fastened to a surface of the glazing and able to guide it in a longitudinally offset manner in sliding, in the vertical direction, directly in a groove of the joint 10. The sliding joint 10 generally comprises two ascending strands 10b connected together by an upper strand 10a. One or each ascending strand has a transversal section substantially in the shape of a U that comprises two axially internal and external branches connected together by an axial connection branch, and which receives the glazing laterally flush with the upright of the frame of the corresponding door or with the vertical trim provided on this frame (with in certain cases this frame which is masked by the glazing).

A guide for glazing 14 in general has a body of elongated shape and having a base that extends along the axis of elongation A of the body. A face of this base is intended to be applied and fastened onto a surface of the glazing 12a, for example internal.

In certain configurations, the guide 14 can cooperate by sliding with the sliding joint, and in particular with a flexible sealing lip of this sliding joint. The lip can be in contact with a face 14aa of the base 14a, opposite the aforementioned face applied on the glazing surface 12a, and can slide on the latter during displacements of the glazing, which are schematically represented by the double arrow F. The lip is thus intended to slide on the face 14aa, in a direction parallel to the axis A of elongation of the body of the guide, over substantially the entire length of the guide.

However, in the current state of the art schematically represented in FIG. 1a, when the glazing 12 slides or is stopped in a given vertical position in the sliding joint 10, a portion of the lip 16 of the sliding joint extends substantially above a free longitudinal end, in particular an upper end 14e of the guide 14, and is separated from the glazing surface 12a by a clearance J (FIG. 1a). This clearance J is not satisfactory as it allows for the passage of air and therefore does not guarantee a perfect seal around the glazing. This clearance is due to the thickness of the longitudinal base 14a of the guide 14, which is applied on the surface of the glazing 12a, which is significant and results in a "step" that the lip 16 has to cross in order to slide between the guide 14 and the glazing surface 12a, and vice versa. This disadvantage leads today to avoid having the lip of the joint cooperate directly with the guide. The lip 16 cooperates rather directly with the glazing surface 12a, as can be seen in FIGS. 3 and 4. This has the negative consequence of an axial oversizing of the sliding joint that has to span the guide in such a way that at least one of its lips 16 can be located beyond the guide in order to cooperate with the glazing surface.

The prior application EP-A1-3 102 448 of the Applicant proposes a solution whereby one of the lips of the sliding joint cooperates with an axial leg 14b of the guide, but this also involves a substantial "step" in order to slide from the guide to the glazing surface 12a.

The invention proposes a simple, effective and economical solution to these problems.

DISCLOSURE OF THE INVENTION

For this purpose, the invention proposes a guide for sliding glazing, in particular for an automobile, said guide being intended to be added and fastened onto a glazing and to cooperate with a sliding joint, said guide comprising a body of elongated shape and having a longitudinal base extending along the axis of elongation of the body and of which a first face is intended to be applied and fastened onto a glazing surface and an opposite second face is intended to cooperate by sliding with said joint, characterised in that said base comprises at at least one free longitudinal end a thinned portion of which the thickness, in a direction substantially perpendicular to said first face, decreases at least in the longitudinal direction in such a way that said second face is flush with said glazing surface on said at least one free end.

The guide thus defined allows for a cooperation of the lip of the sliding joint on the longitudinal base of the guide, and not on the leg thereof. The effect is that the "step" to be compensated via the thinned portion is reduced. In addition, the shape of the guide and this contact on the base rather than on the leg also makes it possible to reduce the thickness and the width of the guide, and therefore to gain in compactness on the overall seal system (dimension of the guide and of the sliding joint).

The guide according to the invention can comprise one or several of the following characteristics, taken separately from one another or in combination with one another:

said thinned portion has a thickness that decreases from a thickness E1, substantially equal to the maximum thickness of said base, to a thickness E2, E1 is between 1 and 5 mm, and preferably between 2 and 3 mm, E2 is less than E1/5, and preferably less than E1/10, E2 is between 0.01 and 1 mm, and preferably between 0.01 and 0.5 mm, said portion has a longitudinal dimension representing between 1 and 10%, and preferably between 2 and 5%, of the total longitudinal dimension of said body, said thinned portion has a width that decreases in the longitudinal direction in such a way that said free end has a width less than the maximum width of the body and/or of said base, said thinned portion has a thickness that also decreases in the transversal direction, said thinned portion comprises a single connection surface of said second face to said glazing surface; here "single connection surface" means a surface without sharp edges, and therefore smooth or without discontinuity, said connection surface has in the longitudinal section a convex slightly curved shape, said connection surface comprises a first longitudinal end that defines said free end, and a second longitudinal end connected to said second face, the angle α formed in a longitudinal plane substantially perpendicular to said first face, between said glazing surface and a tangent to said connection surface on said first longitudinal end, being between 150 and 180°, and/or the angle β formed in the same plane between said second face and a tangent to said connection surface on said second longitudinal end, being between 180 and 210°, said body further comprises a longitudinal leg connected to said base and intended to extend at a distance from said glazing, said leg extends over only a portion of the longitudinal dimension of said base, said thinned portion is separated longitudinally from said leg, said leg comprises at least one retaining hook, said body is formed from a single part, The invention also relates to an equipped sliding glazing, in particular automobile, comprising a glazing and at least one guide such as described hereinabove.

Said guide can be made integral with the glazing by gluing or overmoulding.

Said guide can be fastened on a screen-printed surface of said glazing.

This invention further relates to an assembly comprising an equipped sliding glazing such as described hereinabove and a sliding joint, said joint comprising a flexible lip of elongated shape of which the axis of elongation extends substantially parallel to said axis of elongation of said body, said lip bearing on said second face and able to slide in the longitudinal direction on said second face as well as on said glazing surface by maintaining a substantially continuous contact with the latter.

This invention further relates to a module comprising an assembly such as described hereinabove and a trim of a motor vehicle door frame, said trim comprising an outer face intended to be substantially aligned with an outer face of the glazing.

Advantageously, said trim comprises two rims oriented inwards and substantially perpendicular to said outer face, of which a first rim is engaged in a groove of an outer branch of the sliding joint and of which a second rim is used as a support for an intermediate branch of the sliding joint.

DESCRIPTION OF THE FIGURES

The invention shall be better understood and other details, characteristics and advantages of the invention shall appear upon reading the following description given by way of a non-limiting example and in reference to the accompanying drawings, wherein:

FIG. 1a is a schematic cross-section view of the elements of FIG. 1, when they are engaged in one another and cooperate with one another; for the purposes of information, the cross-section is taken according to the line I-I of FIG. 1.

DETAILED DESCRIPTION

Figure 1:
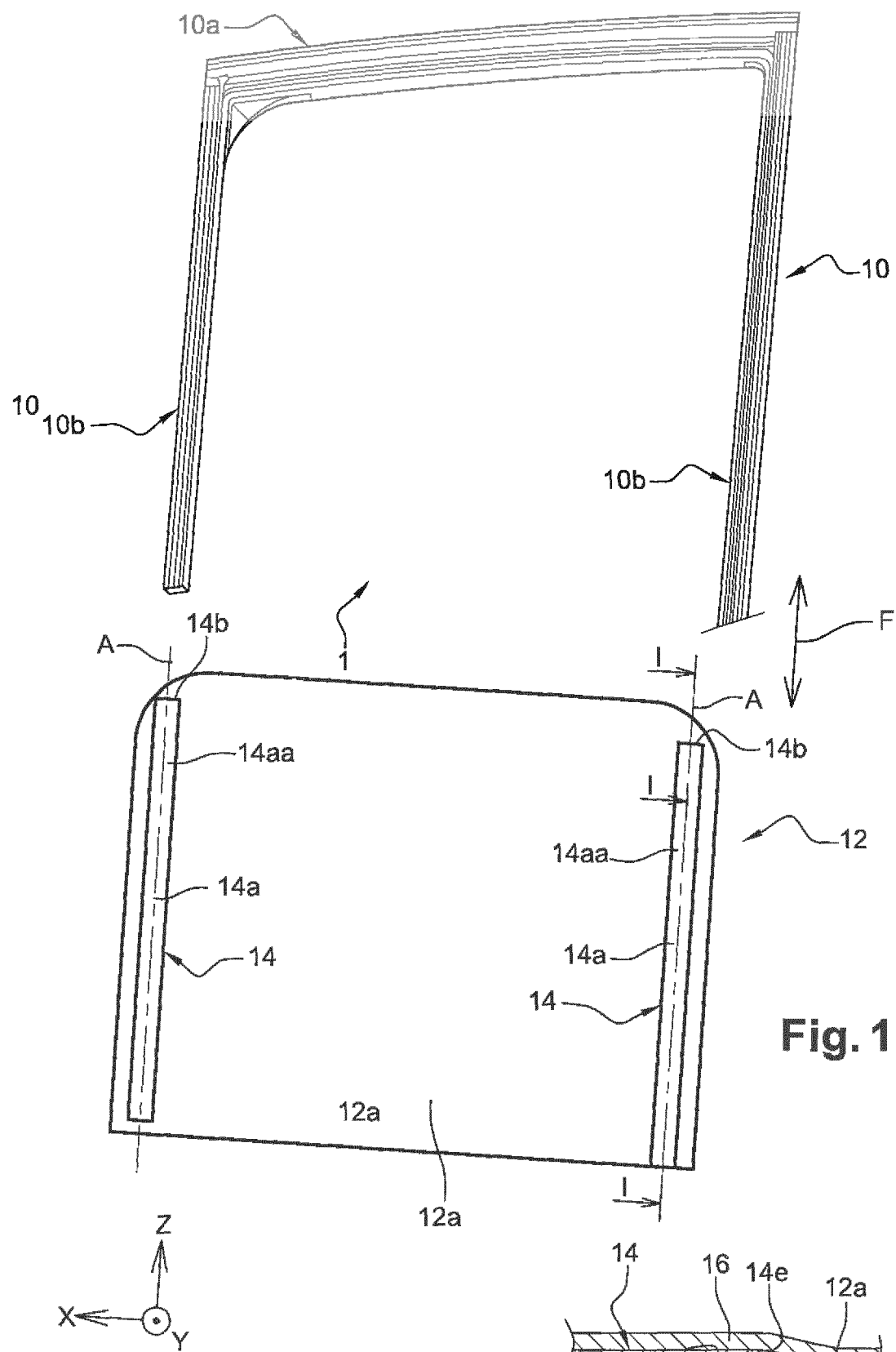
FIG. 1 is a schematic perspective view of a sliding joint and of an equipped sliding glazing, for a motor vehicle door.
Figure 2:
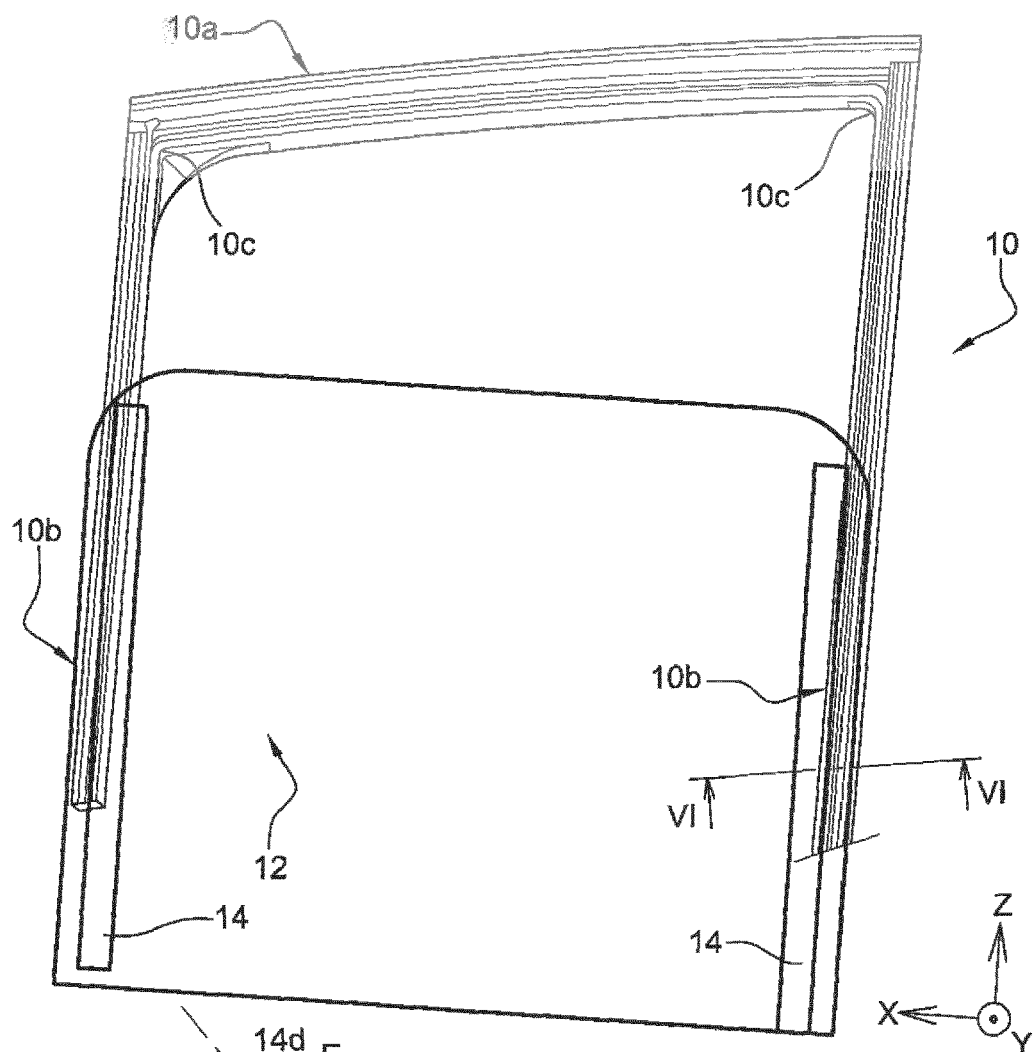
FIG. 2 is another schematic perspective view of a sliding joint and of an equipped sliding glazing, for a motor vehicle door.

FIG. 2 shows an assembly according to the invention, this assembly comprising a sliding joint 10 and an equipped sliding glazing 12, for a motor vehicle.

The sliding joint 10 is intended to be mounted on a frame (not shown) of a front or rear door of the motor vehicle in order to receive the glazing 12 during the rising and lowering sliding thereof in the vertical direction Z of the vehicle.

The sliding joint 10 usually comprises:

an upper strand 10a substantially horizontal or inclined extending in the longitudinal direction X of the vehicle, and two ascending strands 10b connected to the upper strand 10a for example by the intermediary of short moulded connectors 10c.

Figure 5:
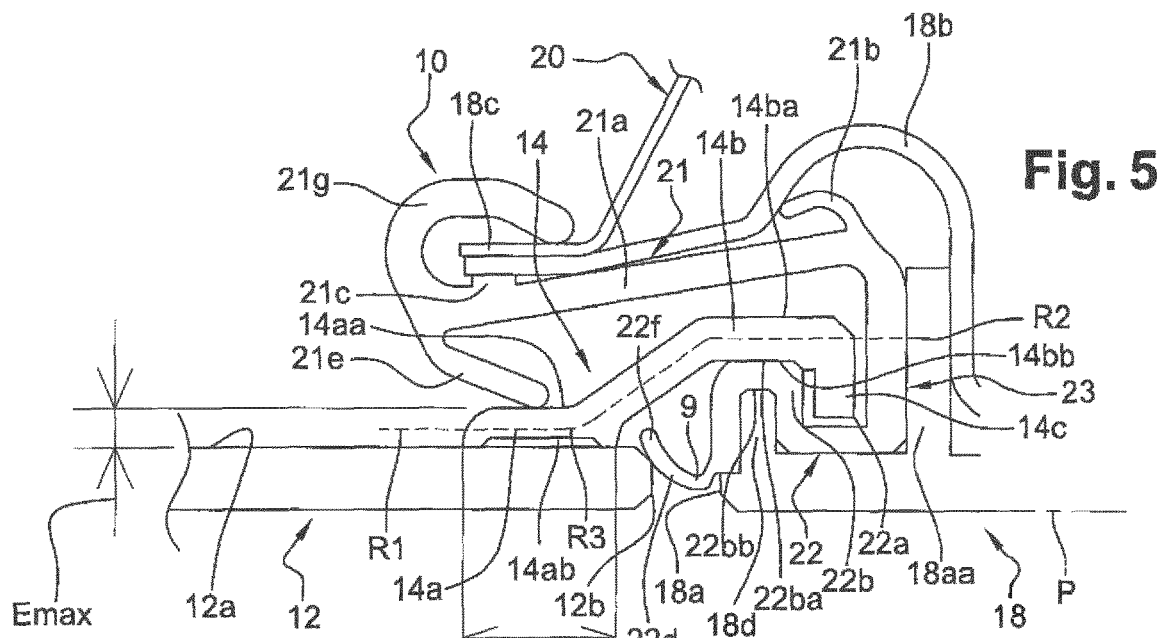

FIG. 5 is a schematic cross-section view according to the line III-III of FIG. 2, and makes it possible to view:

the sliding joint 10, the glazing 12 slidably mounted in the joint 10, a guide 14 integral with an inner face 12a of the glazing 12 in the immediate vicinity of at least one of its vertical edges (i.e. in particular of the rear vertical edge) and able to guide the glazing in sliding in the joint 10 in an offset manner in the direction X, and a vertical external trim 18 of the frame 20 of the door adjacent to the glazing 12 and forming for example a "B" pillar trim, with the axially external surface of which the glazing 12 is mounted laterally flush (i.e. in the same substantially vertical plane P, called a "flush" mount).

In the example of FIG. 5, the joint 10 is entirely carried out in a single piece with elastomeric materials of different hardnesses, and it generally has the shape of an asymmetric U with two axially internal 21 and external 22 branches which each extend substantially in the longitudinal direction X as a transversal section and which are connected together by an axial connection branch 23 forming the core of the U.

The inner branch 21 substantially comprises:

a main rigid portion 21a (for example with a base of a rigid TPV or a rubber) extending substantially in the direction X which is mounted on an internal structure 18b for example as an L of the "B" pillar trim 18a by protrusions 21b, 21c axially directed inwards that it has, of which an internal deformable protrusion 21b which is provided in the manner of an articulation at the junction between the connection branch 23 and the inner branch 21 and which forms a hooking lip to the structure 18b, and a flexible sealing lip 21e (for example with a base of a flexible TPV), with this lip 21e being oriented outwards and obliquely extending (inclined towards the connection branch 23) the end of the main portion 21a and being designed to sealingly bear on a face 14aa oriented inwards of the guide 14, it being understood that the junction between the main portion 21a and the end lip 21e can form a protrusion 21g with a substantially C-shaped section, which is intended to be applied on one end of an internal trim 18c provided on the door frame 20.

The substantially rigid connection branch 23 (for example with a base of a rigid TPV such as that of the main portion 21a of the inner branch 21) axially extends outwards from the internal deformable protrusion 21b to the outer branch 22.

The branch 23 is furthermore here bearing in the direction X on an internal axial rim 18aa of the trim 18

The outer branch 22 substantially comprises:

an axial groove 22a open on the inside and of which an edge is formed by the connection branch 23 and the other edge by a rigid bead 22b projecting axially inwards and of which the top 22ba cooperates with an outer surface of the guide 14; on its outer face, the bead 22b is hollowed out and comprises an axial groove 22bb therefore open outwards for housing an internal rim 18d of the trim 18, and an external flexible sealing lip 22d (for example, such as the internal sealing lips 21e and 21f and the internal deformable protrusion 22b, with a base of a flexible TPV) that forms the free end of the outer branch 22 from the rigid bead 22b and which comprises:

a first oblique portion 22e which is axially curved outwards to an external rounded top S of the lip 22d substantially located in a resting position in the median plane of the glazing 12 and of the trim 18, and which is designed to be mounted in a sealed manner in contact with a vertical edge 18a of the external trim 18, and a second oblique end portion 22f that extends the first portion 22e by being axially curved inwards from the external top S and which is designed to be mounted in bias in a sealed manner in contact with an axially internal portion of the vertical edge 12b of the glazing 12 by ending inwards and facing the inner face 12a of the glazing 12.

The or each guide 14 is made for example from a plastic material such as a polyamide, or a POM or a PP, even from another material, and extends over at least one upper zone of the vertical edge 12b of the glazing 12.

Figure 8:
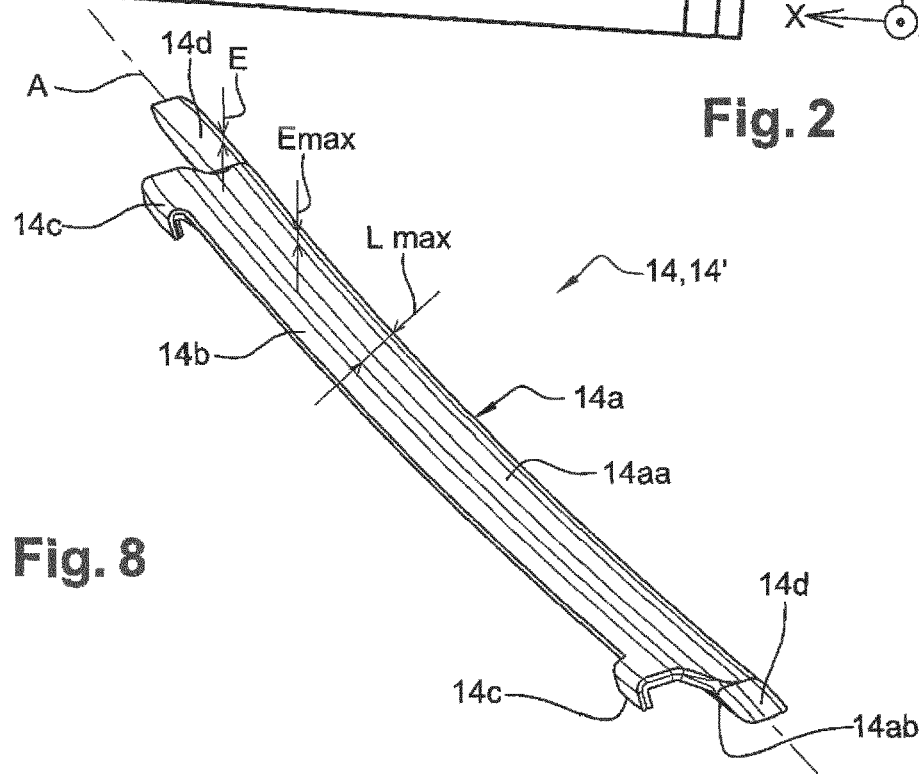
FIG. 8 is a schematic perspective view of the guide that can be seen in FIGS. 6 and 7, FIGS. 9 to 11 are partial schematic perspective views of the assembly of FIGS. 6 and 7.
Figure 3:
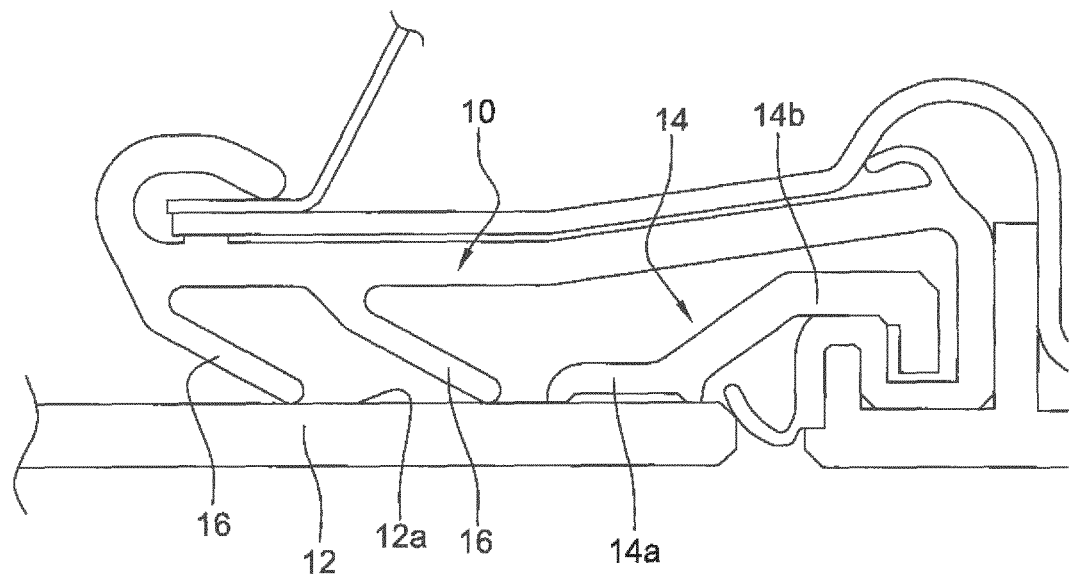
FIGS. 3 and 4 are schematic cross-section views of assemblies comprising an equipped sliding glazing and of a sliding joint, in their mounting environment; for the purposes of information, the cross-section is taken according to the line III-III of FIG. 2, FIGS. 5 to 7 are schematic cross-section views of alternative embodiments of an assembly according to the invention comprising an equipped sliding glazing and a sliding joint, in their mounting environment; for the purposes of information, the cross-section is taken according to the line III-III of FIG. 2.
Figure 4:
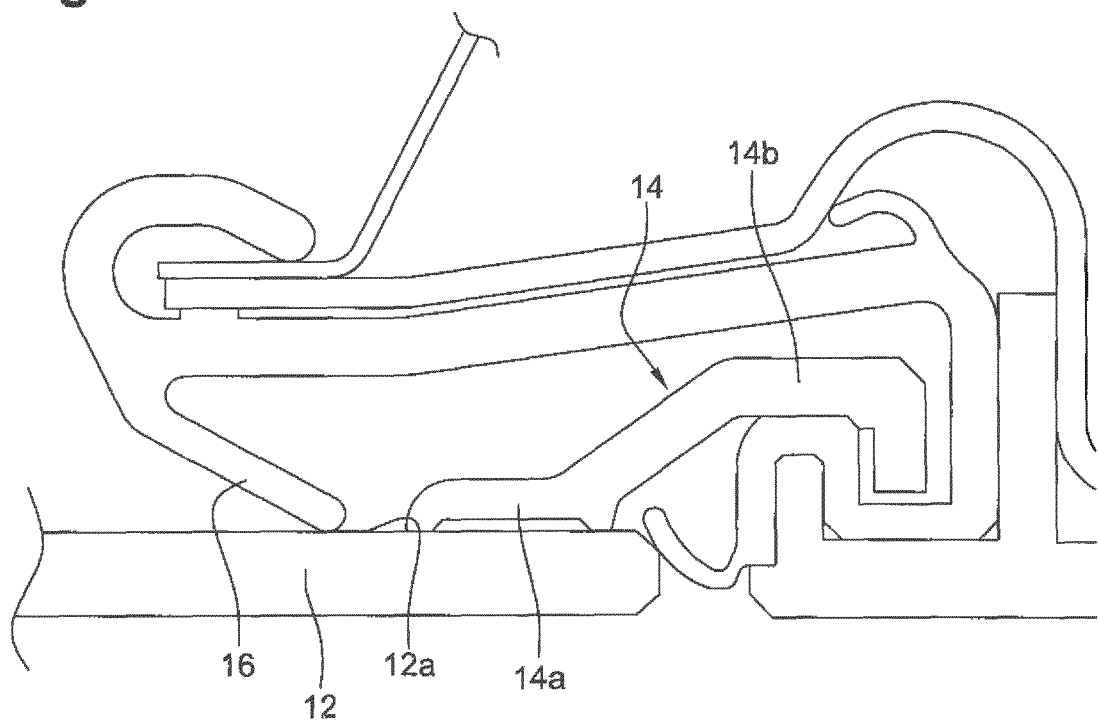

The guide 14 can be seen better in FIG. 8, and comprises a body with an elongated shape and having a base 14a extending along the axis of elongation A of the body and of which a first face, here external 14ab, is intended to be applied and fastened onto the glazing surface 12a and an opposite second face, here internal 14aa, is intended to cooperate by sliding with the joint 10 and in particular the lip 21e, along the longitudinal direction of the guide, i.e. substantially in the vertical direction in the example shown.

The base 14a is integral with the glazing surface 12a and extends in the vicinity of and along the edge 12b. It has a maximum thickness noted as Emax (in the direction Y) and a maximum width noted as Lmax (in the direction X). The maximum length of the guide 14 (in the direction Z) depends in particular on that of the window 12 to be guided.

The body of the guide 14 further comprises an axial leg 14b that extends the base 14a in an offset manner in the direction X, against which the bead 22b bears (on the outer face 14bb of the leg 14b in the vicinity of its free end—FIG. 5).

As can be seen in FIG. 5, the guide 14 has in the transversal cross-section a general shape of an S of which a lower portion is formed by the base 14a, here substantially planar and extending substantially in a plane R1, of which the upper portion is formed by the leg 14b, substantially planar and extending substantially in a plane R2, and of which an intermediate connecting portion of these lower and upper portions, extends substantially in a plane R3, inclined in relation to R1 and R2.

The guide 14 further comprises at the free end of its leg 14b at least one axial hook 14c axially curved outwards and intended to be engaged in the groove 22a extending between the bead 22b and the branch 23 of the sliding joint 10.

Figure 6:
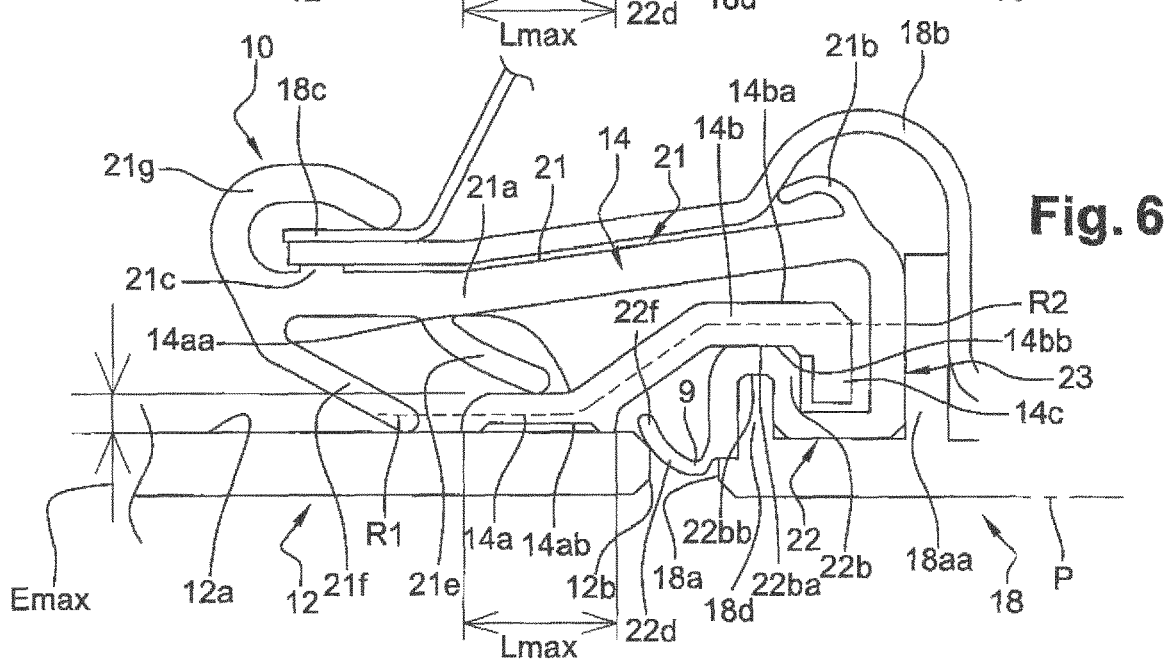
Figure 7:
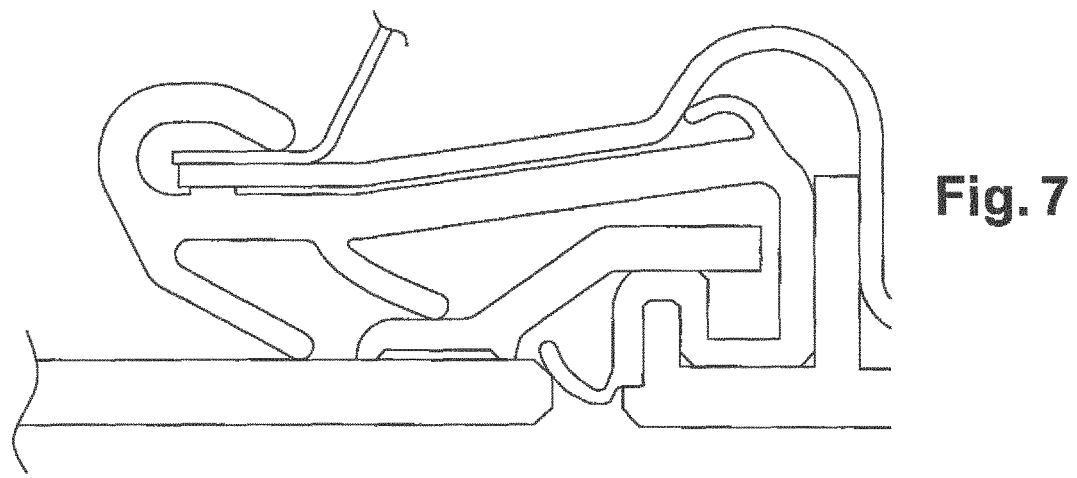

In the variant of FIGS. 6 and 7, the sliding joint 10' shown by at least one of its two ascending strands 10b has the following characteristics.

The joint 10' is entirely made from a single piece from elastomeric materials of different hardnesses, and it generally has the shape of an asymmetric U with two axially internal 21 and external 22 branches that each extend substantially in the longitudinal direction X in the transversal cross-section and which are connected together by an axial connection branch 23 that forms the core of the U.

The inner branch 21 is similar to that of the embodiment of FIG. 5, with the exception that its main portion 21a has two flexible sealing lips 21e and 21f, which comprise:

an intermediate lip 21e, which axially extends outwards and which is designed to bear tightly on a face 14aa oriented inwards of the guide 14, and an end lip 21f which is oriented outwards and which obliquely extends (inclined towards the connection branch 23) the end of the main portion 21a and which is designed to sealingly bear on the inner surface 12a of the glazing 12 clearly beyond the guide 14, it being understood that the junction between the main portion 21a and the end lip 21f can form the protrusion 21g with a section substantially in the shape of a C, which is intended to be applied on an end of the internal trim 18c provided on the door frame 20.

The connection branch 23 is similar to that of the preceding embodiment.

The outer branch 22 is similar to that of the preceding embodiment.

FIG. 6 shows that the guide 14' comprises at the free end of its leg 14b at least one axial hook 14c axially curved outwards and intended to be engaged in the groove 22a extending between the bead 22b and the branch 23 of the sliding joint 10.

FIG. 7 shows that this hook 14c does not extend over the entire longitudinal dimension of the guide 14, with the section being made at a distance from the hook or hooks 14c.

FIG. 7 can also be considered as showing an alternative embodiment of the guide 14' without a hook of the aforementioned type. This type of guide 14' can be mounted on the glazing surface 12a, along an edge opposite that along which extends a guide 14 with hook 14c.

The invention applies to the guides 14, 14' and sliding joints 10, 10' of FIGS. 5 to 7.

According to the invention, the base 14a of the guide 14, 14' comprises at at least one free longitudinal end a thinned portion 14d of which the thickness E, in a direction substantially perpendicular to the face 14aa, decreases at least in the longitudinal direction (axis A) in such a way that the face 14aa is flush with the glazing surface 12a on this free end (FIG. 8).

FIGS. 8 to 11 in particular make it possible to see the thinning of the free end, here the upper end, of the guide 14, 14' and in particular of its base 14a. As can be seen in these figures, the leg 14b which also has an elongated shape along the axis does not extend to the free ends of the base. The upper free ends of the base 14a and of the leg 14b are separated from each other, in the longitudinal or Y direction. In other words, the length of the guide 14, 14' is imposed by the length of the base 14a, which is less than the length of the leg 14b.

In the example shown, the leg 14b comprises at least two retaining hooks 14c in the vicinity of its longitudinal ends (FIG. 8).

The thinned portion 14d of the guide 14, 14' has a thickness E that decreases from a thickness E1 substantially equal to the maximum thickness Emax of the base, to a thickness E2.

By way of example, E1 is between 1 and 5 mm, and preferably between 2 and 3 mm. Also by way of example, E2 is less than E1/5, and preferably less than E1/10. E2 can be between 0.01 and 1 mm, and preferably between 0.01 and 0.5 mm, for example.

In the example shown, the thinned portion 14d has a width that decreases in the longitudinal direction in such a way that said free end has a width less than the maximum width Lmax of the body and/or of the base 14a.

Advantageously, the thinned portion 14d comprises a single connection surface 14da of the face 14aa to the glazing surface 12aa. This connection surface 14da is intended to be in contact with the lip 21e and to cooperate by sliding with this lip during the sliding thereof from the face 14aa to the glazing surface 12a. The surface 14da is therefore continuous, i.e. without sharp edges, in order to ensure continuous sliding of the lip 21e.

Figure 11:
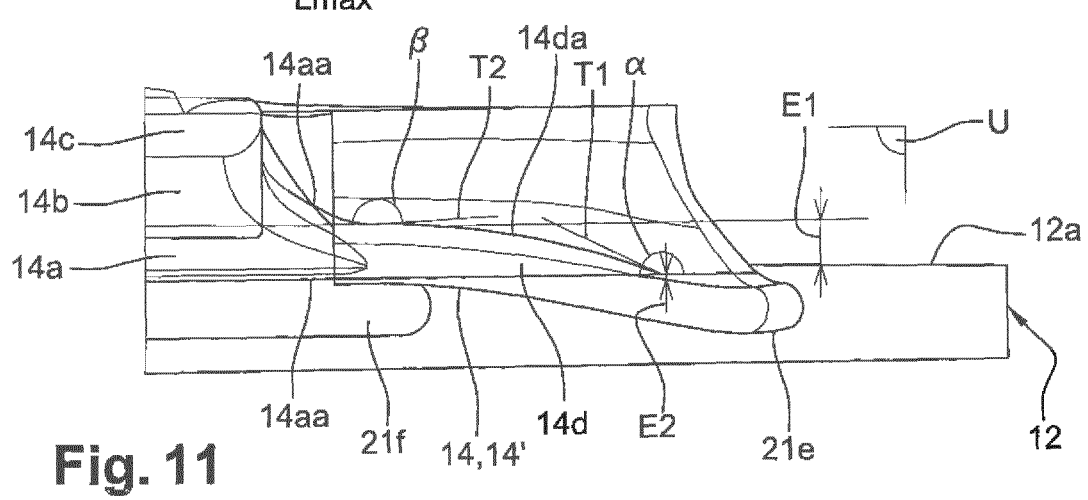

It is observed in FIG. 11 that this connection surface 14da has in the longitudinal section a convex slightly curved shape.

The connection surface 14da comprises a first longitudinal end that defines the free end of the base 14a, and an opposite second longitudinal end connected to the face 14aa. The angle α formed in a longitudinal plane U substantially perpendicular to the face 14ab, between the glazing surface 12a and a tangent T1 to the connection surface 14da on the first longitudinal end, is between 150 and 180°. The angle β formed in the same plane U between the face 14ab and a tangent T2 to the connection surface 14da on the second longitudinal end, is between 180 and 210°.

The guide 14, 14' is here formed from a single piece. It is made integral on the glazing surface 12 by gluing or overmoulding. It can be fastened on an (inner) screen-printed surface of the glazing in order to prevent a person outside the vehicle from being able to see the guide through the glazing.

The assembly shown in the drawings and comprising the sliding glazing 12 equipped with the guide 14, 14' and the sliding joint 10, 10', operates in the following way.

Figure 10:
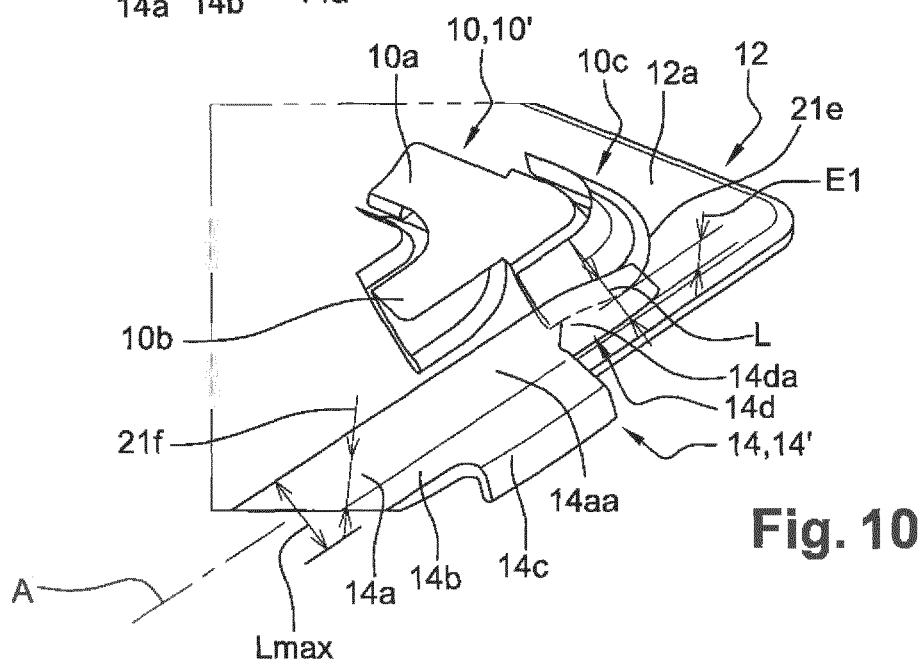

In the low or retracted position, the sliding glazing is located inside the door and its guide 14, 14' can be at a distance from the sliding joint and in particular from the lip 21e. During the displacement of the glazing, the lip slides on the surface 12a of the glazing until it comes into contact with the thinned portion 14d of the guide. Due to the flush configuration mentioned above and the low step or absence of step between the thinned portion 14d and the surface of the glazing, the lip slides on the surface 14da of the thinned portion without difficulty and without generating a clearance with the glazing surface 12a. As the glazing slides, the lip 21e slides on the faces 14da and 14aa, until the thinned portion 14d arrives on the moulded connector 10c between the strands 10a, 10b of the sliding joint 10. In this position, the lip 21a is located on the moulded connector 10c, as shown in FIG. 10, and can pass from the connection surface 14da to the glazing surface 12a by passing in the axial direction X. Advantageously, the thinned portion 14d also has a thickness that decreases also in the transversal direction, in such a way as to also not have a step and therefore a clearance in the transversal direction between the lip 21e and the guide, on the one hand, and between the lip 21e and the glazing surface 12a, on the other hand.

Although the glazing is equipped with two guides in the examples shown, one can suffice. In addition, generally, for a mobile glazing, only one guide needs to have at least one hook, while the thinned portions are recommended for the two guides.

The invention makes it possible to eliminate the "step" according to the prior art and therefore to guarantee a continuous contact and therefore a constant seal between the joint and the guide and between the joint and the glazing surface in particular at the free end of the guide, the unit thereby formed being in an environment that is as reduced as possible (in the axial direction X in particular). This is made possible by a thinning of the guide, which allows for an optimum connection of the bearing and sliding surfaces of the joint on the guide and the glazing surface.

Figure 9:
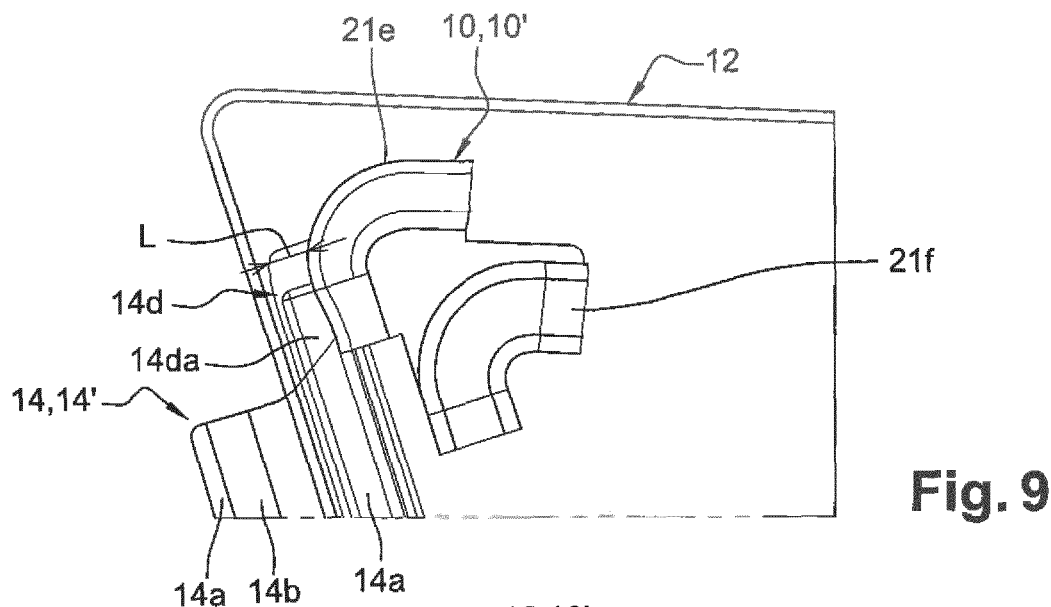

It is important to note that the lips 21e, 21f, which can be seen in FIGS. 9 to 11, are represented in their free state without stress. They appear partially inside the glazing but it must naturally be considered that they are intended to bear on the glazing surface 12a in a compressed or stressed state and to cooperate via sliding respectively on the glazing surface 12a for the lip 21f, and the face 14aa and the glazing surface 12a for the lip 21e.

The invention claimed is:

1. A guide for sliding, said guide fastened onto a glazing and cooperating with a sliding joint, said guide comprising: a body with an elongated shape and a longitudinal base extending along an axis (A) of elongation of the body and a first face of the body fastened to a glazing surface and a second face opposite the first face, the second face positioned to slide with said sliding joint, wherein said longitudinal base comprises a thinned portion at at least one free longitudinal end, wherein a thickness of the thinned portion, in a direction substantially perpendicular to said first face, decreases at least in a longitudinal direction wherein said second face is flush with said glazing surface on said at least one free longitudinal end.

2. The guide according to claim 1, wherein said thinned portion has a thickness that decreases from a first thickness substantially equal to the maximum thickness of said base, to a second thickness.

3. The guide according to claim 2, wherein said first thickness is between 1 and 5 mm.

4. The guide according to claim 2, wherein said second thickness is less than ⅕ of said first thickness.

5. The guide according to claim 4, wherein said second thickness is between 0.01 and 1 mm.

6. The guide according to claim 1, wherein said thinned portion has a width that decreases in the longitudinal direction wherein said free end has a width less than a maximum width of one of the body, said longitudinal base, or both.

7. The guide according to claim 1, wherein said thinned portion has a thickness that decreases in a transversal direction.

8. The guide according to claim 1, wherein said thinned portion comprises a single connection surface of said second face to said glazing surface.

9. The guide according to claim 8, wherein said connection surface has a convex slightly curved shape in a longitudinal section.

10. The guide according to claim 8, wherein said connection surface comprises a first longitudinal end that defines said free end, and a second longitudinal end connected to said second face,
- a first angle formed in a longitudinal plane substantially perpendicular to said first face, between said glazing surface and a tangent to said connection surface on said first longitudinal end, being between 150 and 180°, and
- a second angle formed in the longitudinal plane between said second face and a tangent to said connection surface on said second longitudinal end, being between 180 and 210°.

11. The guide according to claim 1, wherein said body further comprises a longitudinal leg connected to said base and intended to extend at a distance from said glazing.

12. The guide according to claim 11, wherein said longitudinal leg extends over a portion of a longitudinal dimension of said base.

13. The guide according to claim 11, wherein said thinned portion is separated longitudinally from said longitudinal leg.

14. The guide according to claim 11, wherein said longitudinal leg comprises at least one retaining hook.

15. The guide according to claim 1, wherein said body is formed from a single part.

16. Equipped sliding glazing for a motor vehicle, comprising a sliding glazing and at least one guide according to claim 1.

17. Equipped sliding glazing according to claim 16, wherein said guide is integral with the glazing by one of gluing or overmolding.

18. Equipped sliding glazing according to claim 15, wherein said guide is fastened onto a screen-printed surface of said glazing.

19. An assembly comprising: an equipped sliding glazing according to claim 16 and a sliding joint, said joint comprising a flexible lip of an elongated shape with an axis of elongation that extends substantially parallel to said axis of elongation of said body, said lip bearing on said second face and said lip able to slide in a longitudinal direction on said second face and on said glazing surface by maintaining a substantially continuous contact with the glazing surface.

20. A module comprising an assembly according to claim 19 and a trim of a motor vehicle door frame, said trim comprising an outer face substantially aligned with an outer face of said glazing.

21. The module according to claim 20, wherein said trim comprises two rims oriented inwards and substantially perpendicular to said outer face, a first rim is engaged in a groove of an outer branch of the sliding joint and of which a second rim is used as a support for an intermediate branch of the sliding joint.

* * * * *